Aug. 5, 1952 J. H. STARR 2,605,686
POWER LIFT
Filed Oct. 28, 1946
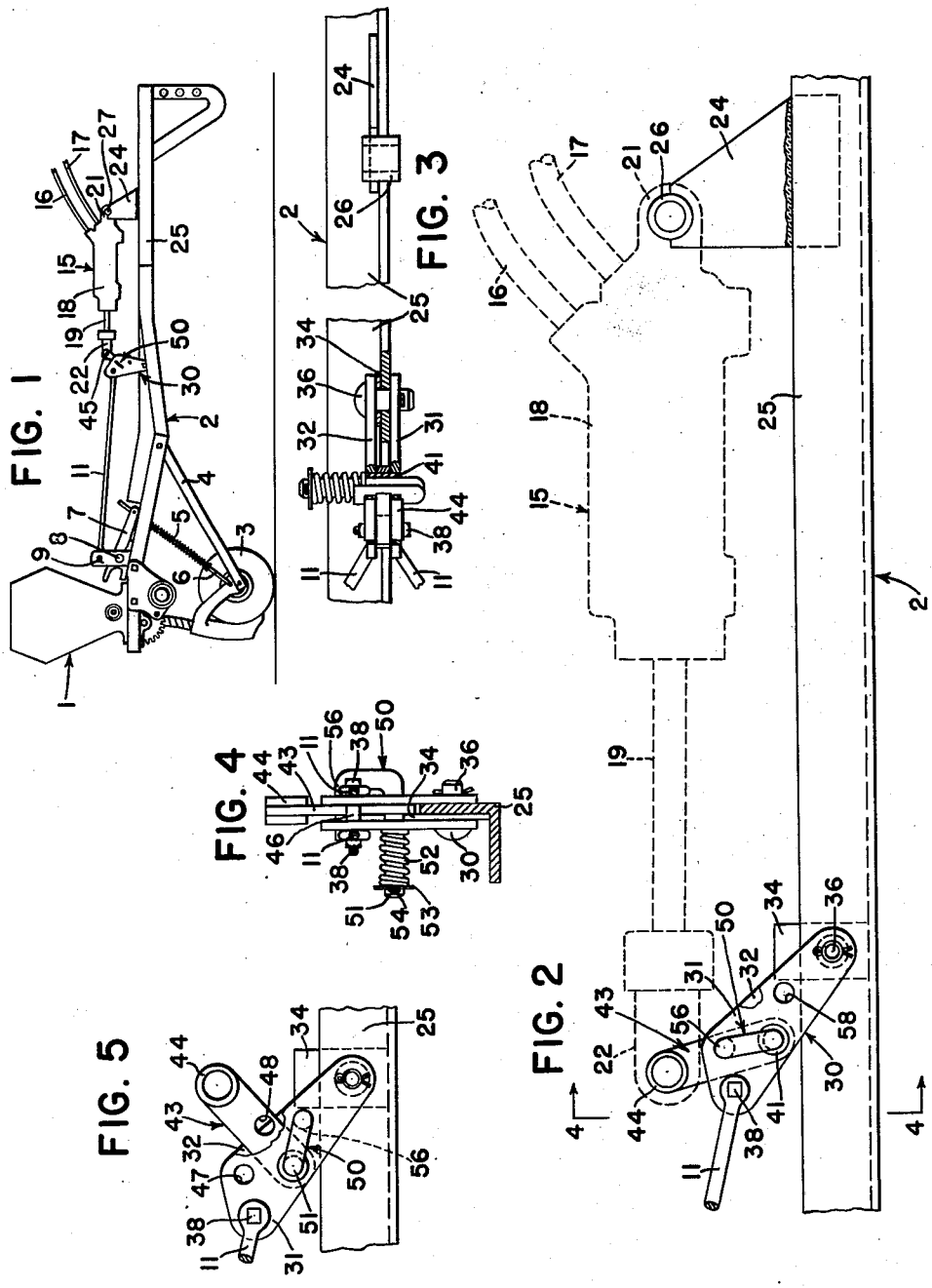
INVENTOR
JOHN H. STARR
BY
ATTORNEYS Patented Aug. 5, 1952

2,605,686

UNITED STATES PATENT OFFICE 2,605,686

POWER LIFT

John H. Starr, Mayville, Wis., assignor to John Deere Van Brunt Company, a corporation of Wisconsin Application October 28, 1946, Serial No. 706,271

3 Claims. (Cl. 97—50)

The present invention relates generally to agricultural implements and more particularly to power operated lifting and/or controlling apparatus embodying a quick attachable and quick detachable ram or cylinder unit for raising, lowering, and/or adjusting earth working tools.

The object and general nature of the present invention is the provision of a grain drill or similar implement having a new and improved cylinder mounting whereby the operation of attaching and detaching the ram or cylinder unit is simplified and made easier to accomplish than heretofore. More particularly, it is a feature of this invention to provide a ram mounting which is so constructed and arranged as to provide a convenient and easily operated means for locking the tools out of their operating position prior to the disconnection of the ram unit from the implement, and further, it is an important feature of this invention to provide ram mounting mechanism wherein there are no loose parts that might become readily disconnected and lost and in which the locking part is permanently associated with the ram mounting means and is simply shifted from one position to another when connecting or disconnecting the ram or cylinder.

These and other objects and advantages of the present invention will be apparent to those skilled in the art after a consideration of the following detailed description, taken in conjunction with the accompanying drawings, in which:

Figure 1 is a side view of a grain drill equipped with a ram mounting mechanism constructed according to the principles of the present invention.

Figure 2 is an enlarged fragmentary view showing the ram mounting mechanism in greater detail.

Figure 3 is a plan view of the ram mounting mechanism shown in Figure 2.

Figure 4 is a sectional view taken generally along the line 4—4 of Figure 2.

Figure 5 shows the ram mounting parts in the position they occupy when the ram or cylinder is disconnected and the furrow openers locked in their raised position.

Referring now to the drawings, particularly Figure 1, the implement in which the principles of the present invention have been illustrated comprises a grain drill, indicated in its entirety by the reference numeral 1, which is made up of a transversely extending seed box mounted on a framework 2 and carrying seed dispensing units of conventional construction which deposits the grain in furrows opened by a plurality of furrow openers 3. The latter are of conventional construction being mounted on individual drag bars 4 and, when in operating position as shown in Figure 1, are yieldably urged downwardly relative to the frame 2 by pressure springs 5 acting against pressure rods 6 which are pivotally connected at their ends with pressure arms 7 that are fixed to a rockshaft 8 mounted for movement by suitable bearings and brackets carried by the frame 2. The rockshaft 8 carries an arm 9 to which the rear end of a pair of links 11 are pivotally connected, and the furrow openers are raised and lowered, or adjusted relative to the frame 2 as to depth of operation, by power transmitted to the rockshaft 8 through the links 11.

Power for raising the tools 3 of the grain drill 1 may be taken from the tractor to which the drill normally is hitched, and preferably the tractor includes a hydraulic ram in the form of a piston and cylinder device flexibly connected with the tractor, as by a pair of hose lines, and, while normally remaining a permanent part of the tractor, is adapted to be mounted on any one of several implements that may selectively be hitched to or mounted on the tractor. Considered broadly, the tools or furrow openers 3 represent any implement operating means whose position is to be adjusted or varied by a detachable hydraulic unit or the like actuated by power derived from the tractor. The present invention is concerned primarily with new and improved means for receiving such a hydraulic unit and providing for easy and quick attachment of the cylinder to the implement and detachment of the cylinder unit from the implement.

As shown in Figure 1, the ram unit is indicated in its entirety by the reference numeral 15 and is connected with the tractor by a pair of hose lines 16 and 17. The ram unit 15 is of conventional construction, so far as the present invention is concerned, including a cylinder 18 and a piston connected to the inner end of a piston rod 19, the flow of fluid to and from opposite ends of the cylinder 18 through the hose lines 16 and 17 being under the control of suitable valve means (not shown) mounted on the tractor. The outer end of the cylinder 18 and the outer end of the piston rod 19 have attachment means in the form of pairs of apertured lugs 21 and 22. A bracket 24 is fixed to one of the angles 25 that make up the grain drill frame 2, and at its upper end the bracket 24 carries a short sleeve 26, forming a tubular part which is adapted to receive a pin 27 of the quick detachable type.

Rearwardly of the bracket 24, the frame angle 25 carries a part or section in the form of a first arm member, indicated in its entirety by the reference numeral 30. The arm member 30 is made up of a pair of plates 31 and 32 disposed on opposite sides of the vertical flange of the angle 25. This section of the angle 25 is also provided with a vertically disposed abutment member 34, to which reference will be made later. The vertical flange of the angle 25 and the member 34 are apertured to receive a pivot pin 36 by means of which the arm member 30 is swingably connected to the grain drill frame 1. The outermost end of the arm member 30 is apertured to receive a pivot member 38 which pivotally connects the forward end of the actuating link 11 to the arm member 30.

A short bushing or tubular member in the form of a ferrule 41 is welded to one of the plates 31 and 32 making up the arm member 30, while the other member is apertured to receive the member 41. Swingably mounted on the ferrule 41 is a part or section in the form of a second arm member 43 the outer end of which carries a short sleeve section 44, preferably of the same size and proportions as the short sleeve 26 on the upper end of the forward bracket 24. The sleeve member 44 is adapted to receive the rear lugs 22 on the piston rod of the hydraulic ram unit 15, being pivotally connected thereto by means of a quick detachable pin 45, preferably of the same construction as the pin 27 mentioned above. Disposed between the two plates 31 and 32 which make up the arm member 30 is a bushing or short sleeve section 46, which forms the portion of the arm member 30 receiving the pivot pin 38, and the sleeve or bushing 46 forms an abutment against which the rear edge of the arm 43 is adapted to bear in one of its positions relative to the arm member 30. In this position, a set of openings 47 in the plates 31 and 32 are in registry with an opening 48 formed in the arm member 43.

In order to lock the arm member 43 to the arm member 30, there is provided, according to the present invention, optionally operable means in the form of a U-shaped pin member 50 one leg 51 of which is elongated and is extended through the tubular member 41. A spring 52 surrounds the leg 51 and is held in position between the arm plate 32 and a washer 53 that is held in place by a cotter 54 or other suitable form of attachment. The pin member 50 is provided with a second leg 56 which is adapted to pass through the openings 47 and 48 when they are in registry, as shown in Figures 1 and 2, that is, when the arm 43 lies against the abutment 46 on the arm member 30, and when the pin 50 is in this position the leg 56 is held in the registering openings 47 and 48 by the action of the spring 52. This locks the two arm members 30 and 43 together so that, with the ram unit 16 mounted in position, extension or retraction thereof serves to swing the interlocked arm members and hence serves to act through the link 11 to rock the pressure shaft 8, either raising or lowering the furrow openers or swinging the pressure arms 7 in a direction to compress the pressure springs 5, thereby holding the furrow openers to their depth of operation against any tendency to ride out of the ground, as when encountering a hard spot in the field. The depth of operation of the furrow openers 3 may be adjusted by suitable operation of the hydraulic valve on the tractor, extending or retracting the ram unit 15 the amount necessary to secure the desired depth adjustment.

When it is desired to disconnect the hydraulic ram unit 15 from the grain drill, as when preparing to detach the grain drill from the tractor, the ram unit is extended its full amount, which brings the parts into the position shown in Figure 2, with the tools in their raised position. The corresponding movement of the arm member 30 brings a second set of openings 58 in the arm member 30 in a position behind the abutment member 34. With the ram unit 15 extended, the pin 50 may be withdrawn against the bias exerted by the spring 52 and then swung around until the leg 56 of the pin 50 is in a position to enter the openings 58 behind the abutment member 34 on the grain drill frame. Then by releasing the pin 50 the leg 56 enters the openings 58 and lies in the position just rearwardly of the rear end of the abutment member 34. Next the pressure in the hydraulic cylinder unit 15 is relaxed. This permits the weight of the tools to rock the arm 30 forwardly a slight amount until the weight causes the leg 56 to bear against the rear edge of the abutment 34. Thus, the weight of the tools is sustained by the pin 50 and the abutment 34. Then by retracting the piston rod a slight additional amount, the arm 43 swings away from the abutment 46 so that all pressure on the pins 27 and 45 is relieved so that these pins may readily be detached and the hydraulic ram unit 15 lifted from the implement.

When reattaching the tractor and the hydraulic unit 15 to the grain drill, the reverse of the steps outlined above is performed. With the pin 50 in place locking the arm member 30 against forward movement relative to the frame of the grain drill, by virtue of the leg 56 lying against the rear edge of the abutment 34, the cylinder unit 15 may readily be mounted in position since the arm member 43 is free to swing relative to the arm member 30. After the cylinder is mounted in place, the valve of the hydraulic unit is operated so as to extend the ram unit 15 the full amount. This takes the load off of the leg 56 of the pin 50 as soon as the arm 43 is forced against the abutment sleeve 46 and the weight of the tools is taken up. Then the leg 56 of the pin 50 may be withdrawn from the openings 58 and swung upwardly and rearwardly until it is in a position to pass through the openings 47 and 48 which are now aligned or in registry, since the arm member 43 lies against the abutment 46. The spring 52 serves to releasably hold the leg 56 of the pin 50 in the registering openings 47 and 48, thus locking the arm 43 to the arm member 30, whereupon the raising and lowering of the tools, and their depth of operation, are controlled by the ram unit 15. It is to be noted that the pin member 50 is merely swung from one position to another in attaching and detaching the ram 15, and since it is never entirely detached from the arm member 30, there is no likelihood of the pin 50 ever becoming lost or misplaced.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement, frame means, an arm swingably mounted thereon, a second arm swingably connected with said first arm, abutment means carried by one of said arms and engageable by the other for limiting movement of one arm relative to the other in one direction, registering openings formed in said arms and adapted to be brought into registry when said other arm engages the abutment means carried by said one arm, and a U-shaped pin member having one leg swingably carried by said one arm member in coincidence with the axis of swinging movement of the second arm member relative to said first arm member, said swingable pin having a second leg adapted to be inserted in said registering openings for locking said arm members together.

2. In an agricultural implement having a part adapted to be moved and frame means with respect to which said part is movable, an arm movably mounted on said frame means and adapted to be operatively connected with said implement part to move the same, a second arm movable relative to said first arm, a tubular part serving as a pivotal connection between said first and second arms, there being a set of openings formed in said arms and said openings being adapted to be brought into registry in one position of said second arm relative to said first arm, a U-shaped pin having an elongated leg disposable in said tubular part and a second leg disposable in said openings when they are in registry, spring means acting against said first leg for urging said second leg into a position entering said openings, a second opening formed in said first arm and spaced from said tubular part so as to receive said second leg of said pin when the latter is in another position relative to said first arm, and abutment means on said frame means in a position to receive said second leg when said pin occupies said second position, for limiting movement of said first arm in at least one direction.

3. In an agricultural implement, frame means, a part shiftably connected with said frame means, a second part shiftably mounted relative to said first part, said parts having openings adapted to be brought into registry, a stop carried by one part and engageable with the other part when said openings are in registry so as to facilitate bringing said openings into registry, a U-shaped pin member having one leg mounted on said first part and a second leg spaced from said first leg so as to be adapted to be inserted through said openings when they are in registry for locking said parts together, a second opening formed in said one part and spaced from the pivot axis of said one leg so as to serve as means for receiving said second leg when it is disconnected from said registering openings, and an abutment carried on said frame means in a position to be engaged by said second leg when the latter is received by said second opening means, whereby said second leg serves to limit movement of said part relative to said frame means.

JOHN H. STARR.

REFERENCES CITED

The following references are of record in the file of this patent:

UNITED STATES PATENTS

| Number | Name | Date |
| --- | --- | --- |
| 649,444 | Good | May 15, 1900 |
| 777,099 | Hillyard | Dec. 13, 1904 |
| 1,271,316 | Hill | July 2, 1918 |
| 2,167,421 | Jann et al. | July 25, 1939 |
| 2,324,840 | Hipple | July 20, 1943 |
| 2,344,123 | Brown et al. | Mar. 14, 1944 |
| 2,532,577 | Silver et al. | Dec. 5, 1950 |

FOREIGN PATENTS

| Number | Country | Date |
| --- | --- | --- |
| 108,038 | Australia | July 19, 1939 |